(12) United States Patent
Suzuki et al.

(10) Patent No.: US 7,322,580 B2
(45) Date of Patent: Jan. 29, 2008

(54) STABILIZER CONTROL DEVICE

(75) Inventors: Katsumi Suzuki, Takahama (JP); Akiya Taneda, Anjo (JP); Yoshiyuki Yasui, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 412 days.

(21) Appl. No.: 10/874,536

(22) Filed: Jun. 24, 2004

(65) Prior Publication Data

US 2005/0023789 A1 Feb. 3, 2005

(30) Foreign Application Priority Data

Jun. 27, 2003 (JP) ............................ 2003-185600
Dec. 24, 2003 (JP) ............................ 2003-426396

(51) Int. Cl.
*B60G 17/005* (2006.01)
*B60G 17/015* (2006.01)
*B60G 21/05* (2006.01)

(52) U.S. Cl. ............................... 280/5.502; 280/5.511; 280/124.106

(58) Field of Classification Search ................. 280/5.5, 280/5.501, 5.502, 5.506, 5.511, 124.106, 280/124.107
See application file for complete search history.

(56) References Cited

U.S. PATENT DOCUMENTS 4,981,309 A * 1/1991 Froeschle et al. ........ 280/6.157
5,028,073 A * 7/1991 Harms et al. ............ 280/5.501
5,441,298 A 8/1995 Miller et al.
6,076,837 A * 6/2000 Kokotovic ............... 280/5.504
6,290,245 B1 * 9/2001 Ishikawa et al. ........ 280/124.16
6,425,585 B1 * 7/2002 Schuelke et al. ........ 280/5.511
6,942,227 B2 * 9/2005 Heller et al. ............. 280/5.502
2003/0075881 A1 * 4/2003 Delorenzis et al. .......... 280/5.5

FOREIGN PATENT DOCUMENTS

| DE | 198 46 275 A1 | 12/1999 |
| EP | 1 362 721 A2 | 11/2003 |
| EP | 1 426 208 A1 | 6/2004 |
| JP | 2002-518245 | 6/2002 |

* cited by examiner

*Primary Examiner*—Paul N. Dickson
*Assistant Examiner*—Joseph Rocca
(74) *Attorney, Agent, or Firm*—Buchanan Ingersoll & Rooney PC (57) ABSTRACT

A stabilizer control device includes a pair of stabilizer bar positioned between right, left wheels of a vehicle, an electric motor, an actuator positioned between said pair of the stabilizer bar, the actuator comprising the electric motor, and a control means for controlling the electric motor in accordance with a turning state of the vehicle. At least one motor relay positioned in parallel with corresponding number of coil of the electric motor. The motor relay is short circuited when electric power is not supplied to the electric motor.

12 Claims, 13 Drawing Sheets

STABILIZER CONTROL DEVICE

CROSS REFERENCE TO RELATED APPLICATIONS

This application is based on and claims priority under 35 U.S.C. §119 with respect to Japanese Patent Application No. 2003-185600 filed on Jun. 27, 2003 and Japanese Patent Application No. 2003-426396 filed on Dec. 24, 2003, the entire content of which are incorporated herein by reference.

FIELD OF THE INVENTION

The present invention relates to a stabilizer control device for a vehicle. More particularly, the present invention pertains to a stabilizer control device variably controlled by an electric motor.

BACKGROUND

Stabilizer control devices for vehicles are configured to reduce or restrain the rolling motion of the vehicle by providing the appropriate rolling moment from the outside by the operation of the stabilizer during the turning traveling of the vehicle. A known roll stabilization system of a vehicle that includes an actuating arrangement described in Published Japanese Translation of PCT International Publication for Patent Application No. 2002-518245 includes a stabilizer bar halved on the front and the rear axle and a slewing drive arranged between halves of the stabilizer bar.

The vehicle roll stabilization system described in Published Japanese Translation of PCT International Publication for Patent Application No. 2002-518245 includes a lock means for locking the displacement to the opposite direction at the turning at a halved portion of the stabilizer in order to reduce the rolling motion beyond the adjusting range compared to the vehicle which does not includes the roll stabilization system. An electromagnetic application brake or an electromagnetic release brake is used for the locking. In case the electromagnetic application brake is used, it is ensured that adjusting actuators provided at the front axle and the rear axle are locked at the respective neutral positions for overcoming the inclination attitude of the vehicle body traveling straight when the vehicle roll stabilization system is at the failure. The halved portions of the stabilizer locked relatively each other serve as a passive torsion bar.

Notwithstanding, with the construction of the vehicle roll stabilization system described in Published Japanese Translation of PCT International Publication for Patent Application No. 2002-518245, the mechanical means such as the electromagnetic application brake and the electromagnetic release brake are required to be provided between a motor and a deceleration gear device for the locking, which is inevitable for increasing the size of the actuator. In addition, because the stabilizer bar is held at the vehicle body and end portions of the stabilizer bar are fixed at a suspension member with the actuator of the vehicle roll stabilization system, the size increase of the actuator is disadvantageous to the boarding due to the arrangement restriction when boarding the actuator at the vehicle.

A need thus exists for a stabilizer which maintains a favorable roll characteristics even when the electric power is not supplied and the stabilizer is at the failure without increasing the size of an actuator for restraining the torsional rigidity of the stabilizer.

SUMMARY OF THIS INVENTION

In light of the foregoing, the present invention provides a stabilizer control device which include a pair of stabilizer bar positioned between right, left wheels of a vehicle, an electric motor, an actuator positioned between said pair of the stabilizer bar, the actuator including the electric motor, a control means for controlling the electric motor in accordance with a turning state of the vehicle, a coil provided in the electric motor, and at least one motor relay positioned in parallel with the coil of the electric motor. The motor relay is short circuited when electric power is not supplied to the electric motor.

According to another aspect of the present invention, a stabilizer control device includes a pair of stabilizer bar positioned between right, left wheels of a vehicle, an electric motor, an actuator positioned between said pair of the stabilizer bar, the actuator including the electric motor, a control means for controlling the electric motor in accordance with a turning state of the vehicle, a coil provided in the electric motor, and at least one motor relay positioned in parallel with the coil of the electric motor, and a failure judging means for judging the failure of the stabilizer control device. The motor relay is short circuited when the failure judging means judges the failure of the stabilizer control device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to the illustrations of the drawing figures as follows.

Figure 1:
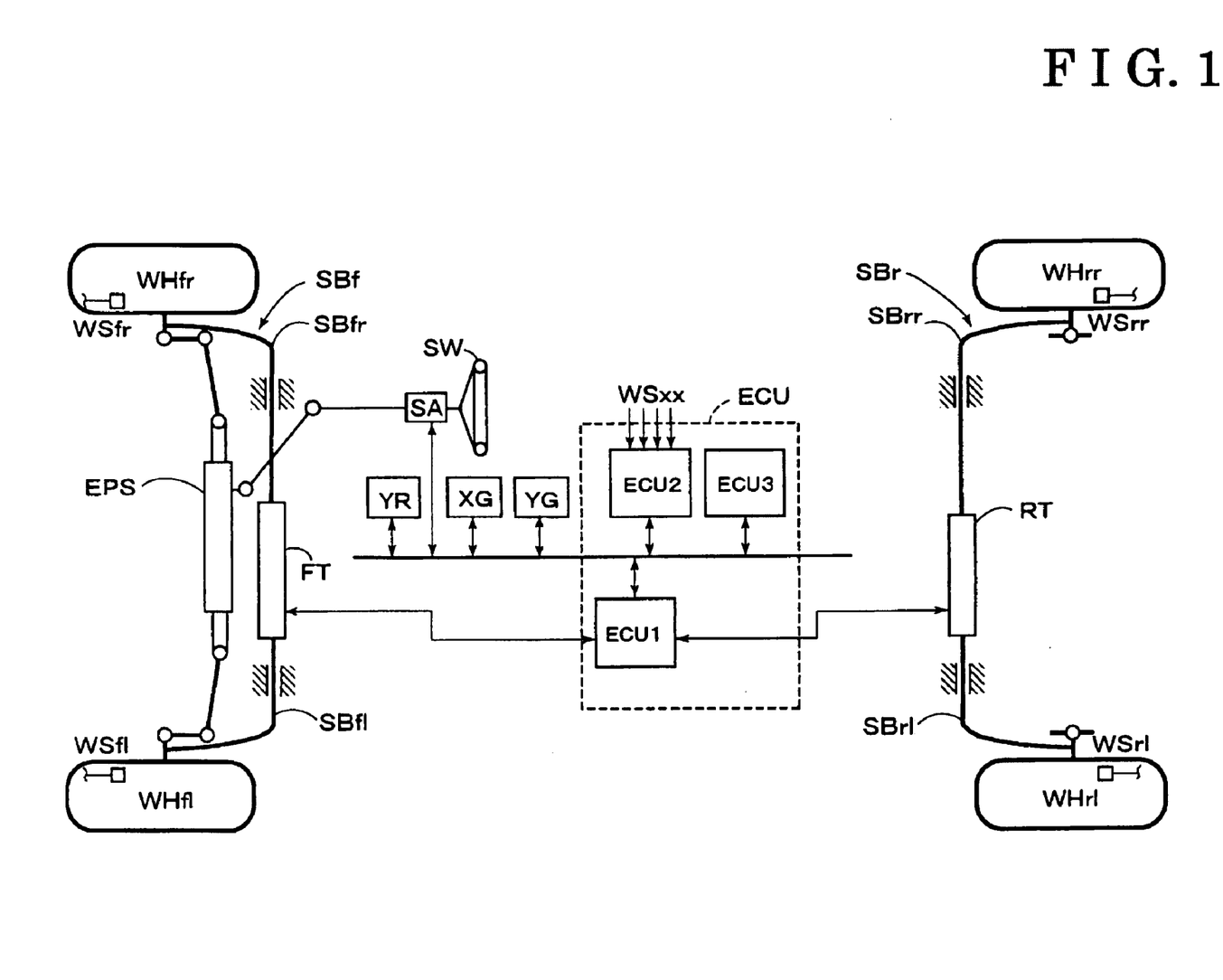
FIG. 1 shows an overview of a vehicle including a stabilizer control device according to a first embodiment of the present invention.

As shown in FIG. 1, the stabilizer control device includes a stabilizer SBf for front wheel and a stabilizer SBr for rear wheel serving as torsion springs when the rolling motion is inputted to the vehicle. The stabilizer SBf for the front wheel and the stabilizer SBr for the rear wheel are constructed to variably control the respective torsional rigidity by stabilizer actuators FT, RT for restraining the vehicle body roll angle corresponding to the rolling motion of the vehicle body. A stabilizer control unit ECU 1 provided in an electronic control unit ECU controls the stabilizer actuators FT, RT.

As shown in FIG. 1, each wheel WHfr, WHfl, WHrr, WHrl is provided with each wheel speed sensor WSfr, WSfl, WSrr, WSrl. Front wheels WHfr, WHfl are steered by a EPS. The wheel speed sensors WSfr, WSfl, WSrr, WSrl are connected to the electronic control unit ECU so that the pulse signals with the pulse number proportional to the wheel speed, that is, the rotational speed of each wheel, is inputted to the electronic control unit ECU. Further, the electronic control unit ECU is connected to a steering angle sensor SA for detecting a steering angle δf of a steering wheel SW, a longitudinal acceleration sensor XG for detecting the longitudinal acceleration Gx of the vehicle, a lateral acceleration sensor YG for detecting the lateral acceleration Gy, and a yaw rate sensor YR for detecting the yaw rate Yr of the vehicle.

The electronic control unit ECU includes the stabilizer control unit ECU1, a brake control unit ECU2, and a steering control unit ECU3. The control units ECU1-3 are connected to a communication bus via a communication unit including a CPU, a ROM, and a RAM for the communication respectively. Thus, the information used for each control system can be sent from other control system.

Figure 2:
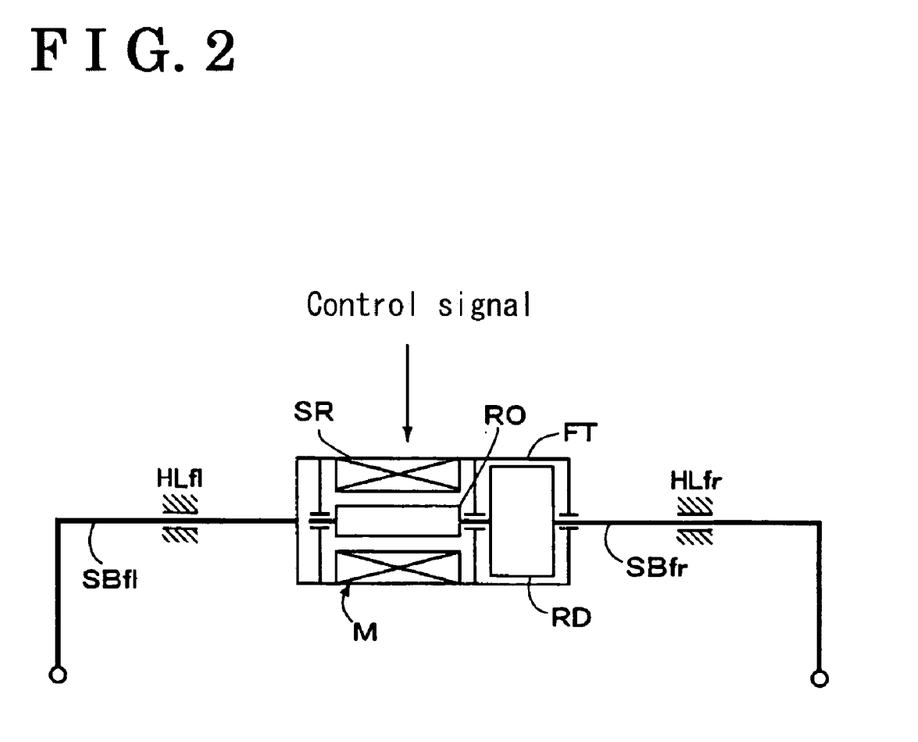
FIG. 2 shows a construction of a stabilizer actuator according to the first embodiment of the present invention.

As shown in FIG. 2, the stabilizer SBf for the front wheel is halved into a stabilizer bar SBfr and a stabilizer bar SBfl. A first end of the stabilizer bar SBfr at the right is connected to a right front wheel. A first end of the stabilizer bar SBfl at the left is connected to a left front wheel. A second end of one of the stabilizer bar SBfr and the stabilizer bar SBfl is connected to a rotor RO of an electric motor M via a decelerator RD. A second end of the other of the stabilizer bar, SBfr and the stabilizer bar SBfl is connected to a stator SR of the electric motor M. The stabilizer bar SBfr and the stabilizer bar SBfl are held at the vehicle body by holding means HLfr, HLfl. Thus, when the electric motor M is energized, because the torsional force is generated relative to the stabilizer bar SBfr and the stabilizer bar SBfl to change the torsion spring characteristics of the stabilizer SBf for the front wheel on the surface, the roll stiffness of the vehicle body is controlled. The construction of the stabilizer actuator RT is likewise the construction of the stabilizer actuator FT.

Figure 3:
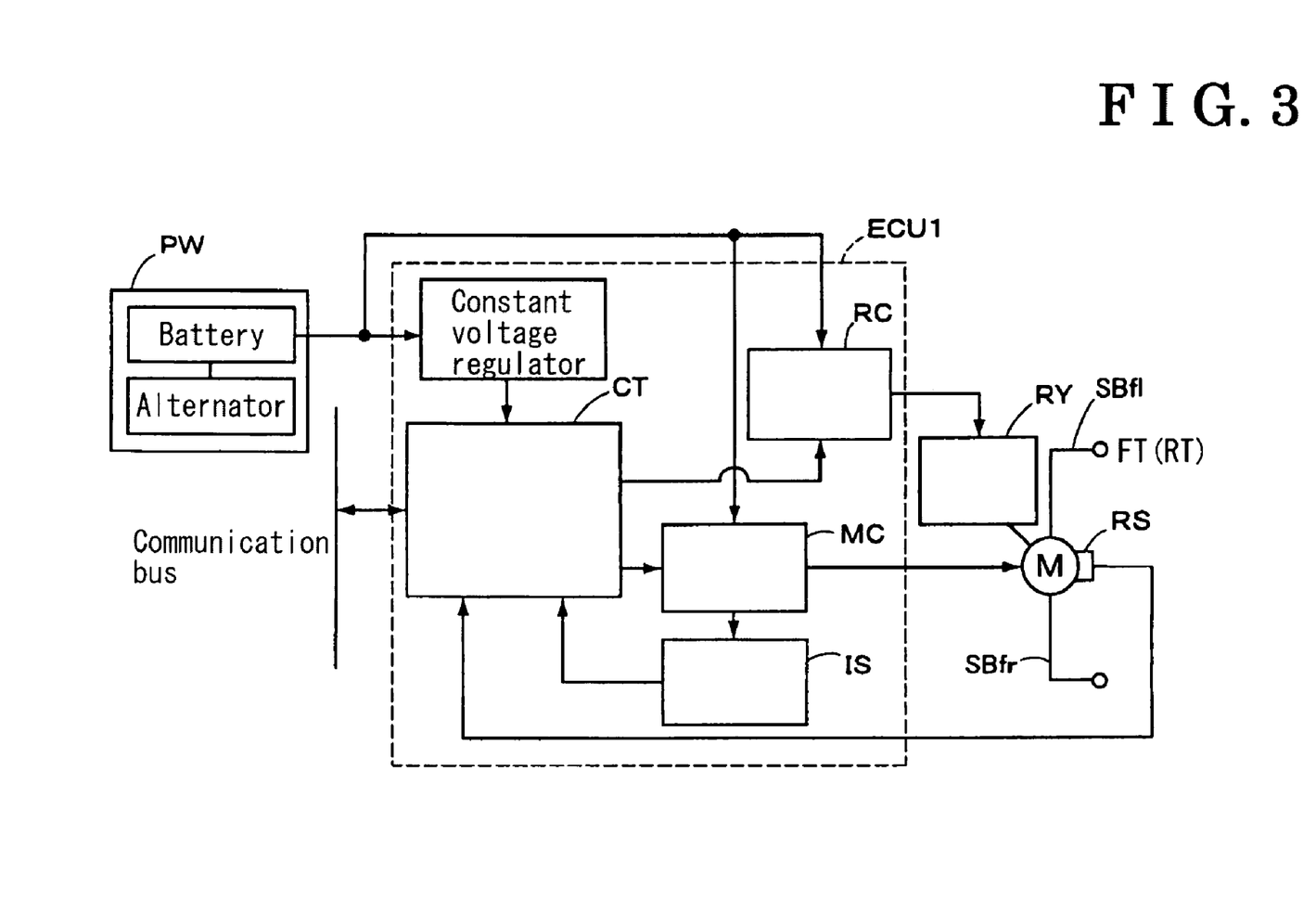
FIG. 3 shows a block diagram of a stabilizer control unit according to the first embodiment of the present invention.

The electric motor M included in the stabilizer actuator FT at the stabilizer SBf for the front wheel is controlled to be driven by the stabilizer control unit ECUL. As shown in FIG. 3, the stabilizer control unit ECUL includes a relay drive circuit RC, a motor drive circuit MC, an electric current detection portion IS, a controller CT, and a constant voltage regulator. The driving electric current supplied from the motor drive circuit MC to the electric motor M is controlled by the controller CT. In this case, the driving electric current supplied from the motor drive circuit MC is detected by the electric current detection portion IS to be fed back to the controller CT along with a rotational angle signal of the electric motor M detected by a rotational angle detection means RS.

The controller CT controls a roll restraint control, a motor servo control, and a failure judgment based on the signal including the steering angle δf by an operator and a vehicle motion state amount. In accordance with the result of the control and the judgment at the controller CT, the relay drive circuit RC and the motor drive circuit MC are controlled and a motor relay RY and the electric motor M are controlled. In case the failure is generated at the device, terminals of the electric motor M are short circuited by the motor relay RY. This generates the braking torque at the electric motor M using the counter electromotive force generated at the electric motor M. Accordingly, the sudden change of the vehicle body roll angle can be restrained.

Figure 4:
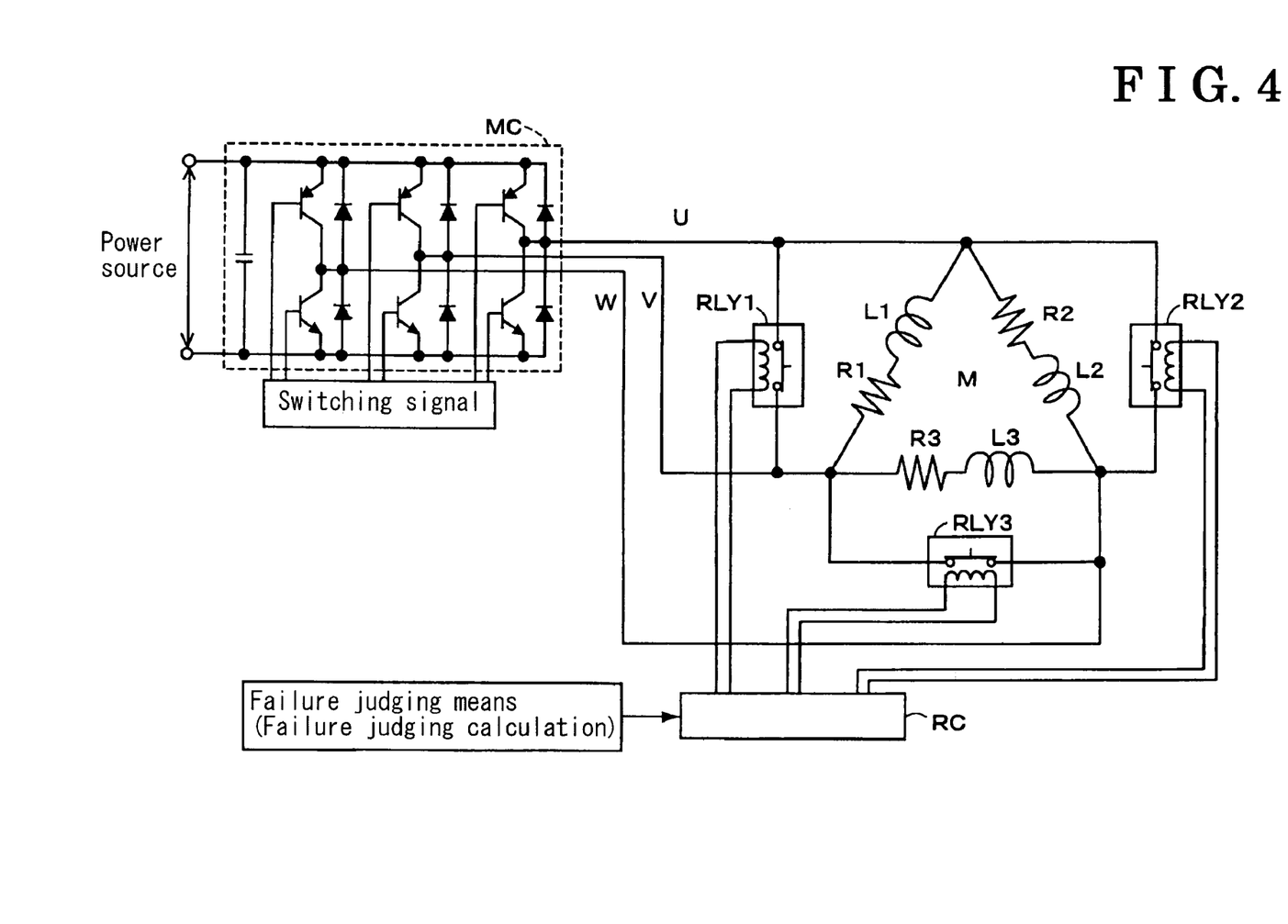
FIG. 4 shows a diagram showing a system for controlling the roll stiffness in accordance with a turning state by the stabilizer actuator according to the first embodiment of the present invention.

As shown in FIG. 4, relays RLY1, RLY2, RLY3 configured to short-circuit terminals are provided between the three-phase electric motor M arranged to be connected in parallel with coils L1, L2, L3 of the electric motor M. With the construction shown in FIG. 4, the relays RLY1, RLY2, RLY3 are positioned to be able to short circuit each phase of a U-phase, a V-phase, and a W-phase at the electric motor M. One of the relays among the relays RLY1, RLY2, RLY3 may be omitted because all phases are short circuited by short circuiting any of two phases among three phases. Further, because the braking torque is obtained when the short circuit is attained between at least two phases out of the three phases, at least one motor relay is sufficient to serve for its function. In case the redundant is wanted as the system, it is preferable to position the motor relays between the all phases. Although a brushless motor including three phases is applied for the electric motor M, the construction of the motor is not limited and the motor M including different phase numbers and a brush motor are applicable.

In case it is judged that the device (e.g., the stabilizer actuator FT) is at the failure based on the judgment result of the failure judging means including the failure judgment calculation by the controller CT, the circuit of the relays RLY1, RLY2, RLY3 is short-circuited. Because the relays RLY1, RLY2, RLY3 are the normal close type relays assuming to be short circuited at the non-energization state, the short circuit is formed at the coils L1, L2, L3 of the electric motor M. Thus, the electric current generated by the counter electromotive force generated by the rotation of the electric motor M flows in the short circuited relay circuit. In other words, the potential difference between the electric voltage of the ends of respective coils L1, L2, L3 of the electric motor M assumes to be absent so that the electric motor M operates to stop. In this case, the electric current by the counter electromotive force generated by the rotation of the electric motor M flows at the short circuit.

The electric current by the counter electromotive force flows at the coils L1, L2, L3 to be consumed by the internal resistance of the circuit for gradually reducing the electric current value, which serves as the braking torque of the electric motor M functioning as applying the braking force to prevent the rotation by the external force (i.e., the vehicle body inertia force) relative to the electric motor M. Thus, the short circuit is formed by the motor relay RY including the relays RLY1, RLY2, RLY3, the braking torque is applied to the electric motor M by the counter electromotive force generated by the formation of the short circuit, and the vehicle body roll angle variation is restrained. Further, the desired deceleration relative to the electric motor M is performed so that the vehicle body roll angle variation includes the favorable characteristics. In that case, the opening and the closing of the short circuit of the relays RLY1, RLY2, RLY3 may be repeated periodically plural times and the timing for short circuiting each relay RLY1, RLY2, RLY3 and the operational time may be controlled in order to applied to the favorable patterns.

Figure 12:
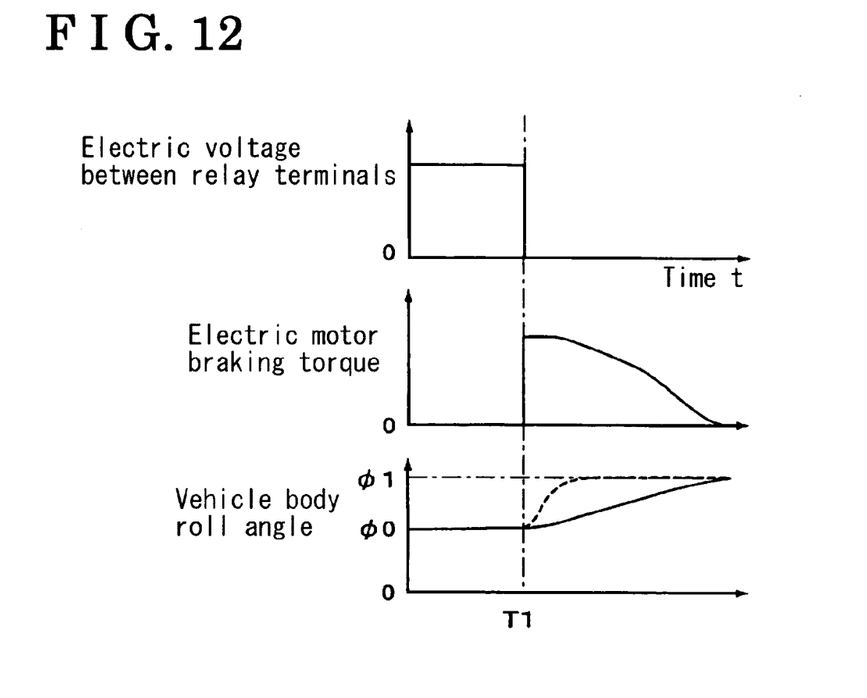
FIG. 12 is a graph showing characteristics of the stabilizer control device under the state that the stabilizer control device is at the failure during the constant turning state of the vehicle according to the first embodiment of the present invention.

The effects of the construction of the embodiment when the failure is generated during the turning traveling of the vehicle will be explained with reference to FIG. 12. In case the stabilizer control device according to the embodiment of the present invention is not applied, because an electric motor positioned between a pair of the stabilizer bar for controlling the relative position of the respective stabilizer bars is rotated by the external force (i.e., the inertia force affecting the vehicle body), the torsional rigidity of the stabilizer declines. Thus, the vehicle body roll angle suddenly increases to assume the characteristics shown with a dotted line of FIG. 12. On the other hand, with the construction of the stabilizer control device according to the embodiment of the present invention, when the failure is judged at a time T1 (shown in FIG. 12), the motor relay RY is short circuited immediately so that the electric voltage between each relay terminal assumes zero. Accordingly, the counter electromotive force is generated so that the braking torque is generated at the electric motor M to control the rotation of the electric motor M by the external force (i.e., the vehicle body inertia force). Thus, as shown with an actual line of FIG. 12, because the increase of the vehicle body roll angle is restrained and the vehicle body roll angle variation is time-wise gentle, the operator is likely to cope with the failure.

Figure 13:
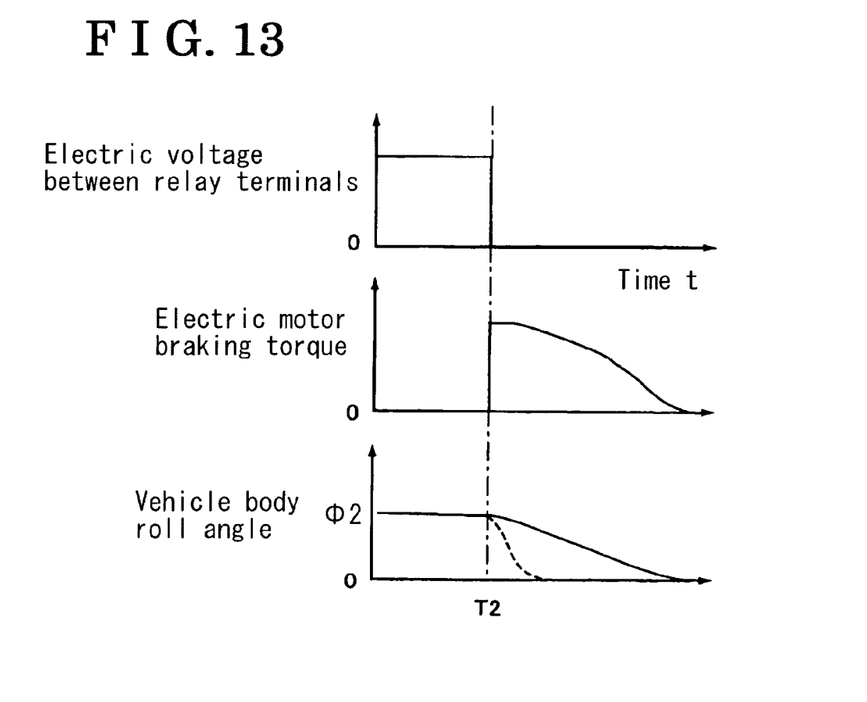
FIG. 13 is a graph showing characteristics of the stabilizer control device when the stabilizer control device assumes to be the failure after the generation of the roll angle of the vehicle and the vehicle travels maintaining the state.

In case the failure is generated after the generation of the roll angle of the vehicle body and the vehicle is traveling while maintaining the state with the generated roll angle with the vehicle which is not applied with the stabilizer control device according to the embodiment of the present invention, as shown in FIG. 13, the torsional action of the stabilizer is suddenly released when the failure is judged at a time T2 to stop the energization to the electric motor M is stopped. Thus, the vehicle body roll angle of the vehicle which is not applied with the stabilizer control device according to the embodiment of the present invention is suddenly diminished to provide the uncomfortable feeling to the operator. On the other hand, with the construction of the stabilizer control device according to the embodiment of the present invention, in case the failure is judged at the time T2, because the short circuit between the motor terminals is formed and the braking torque is applied to the electric motor M, the vehicle body roll angle gradually diminishes, which does not provide the uncomfortable feeling to the operator.

The failure includes the failure of the power source system PW and the other failure. First, the failure of the power source system PW will be explained as follows. Even when the power is not supplied to the stabilizer actuator, the motor terminals have to be securely short-circuited. The normal close type relays short circuited at the non-energization state at which the electric power is not supplied is used for the relays RLY1, RLY2, RLY3 of FIG. 4. When the system is operated, first, each relay is driven from the closed position to the open position, the short circuit state between the motor terminals is canceled, and the energization to the electric motor M is conducted.

Figure 5:
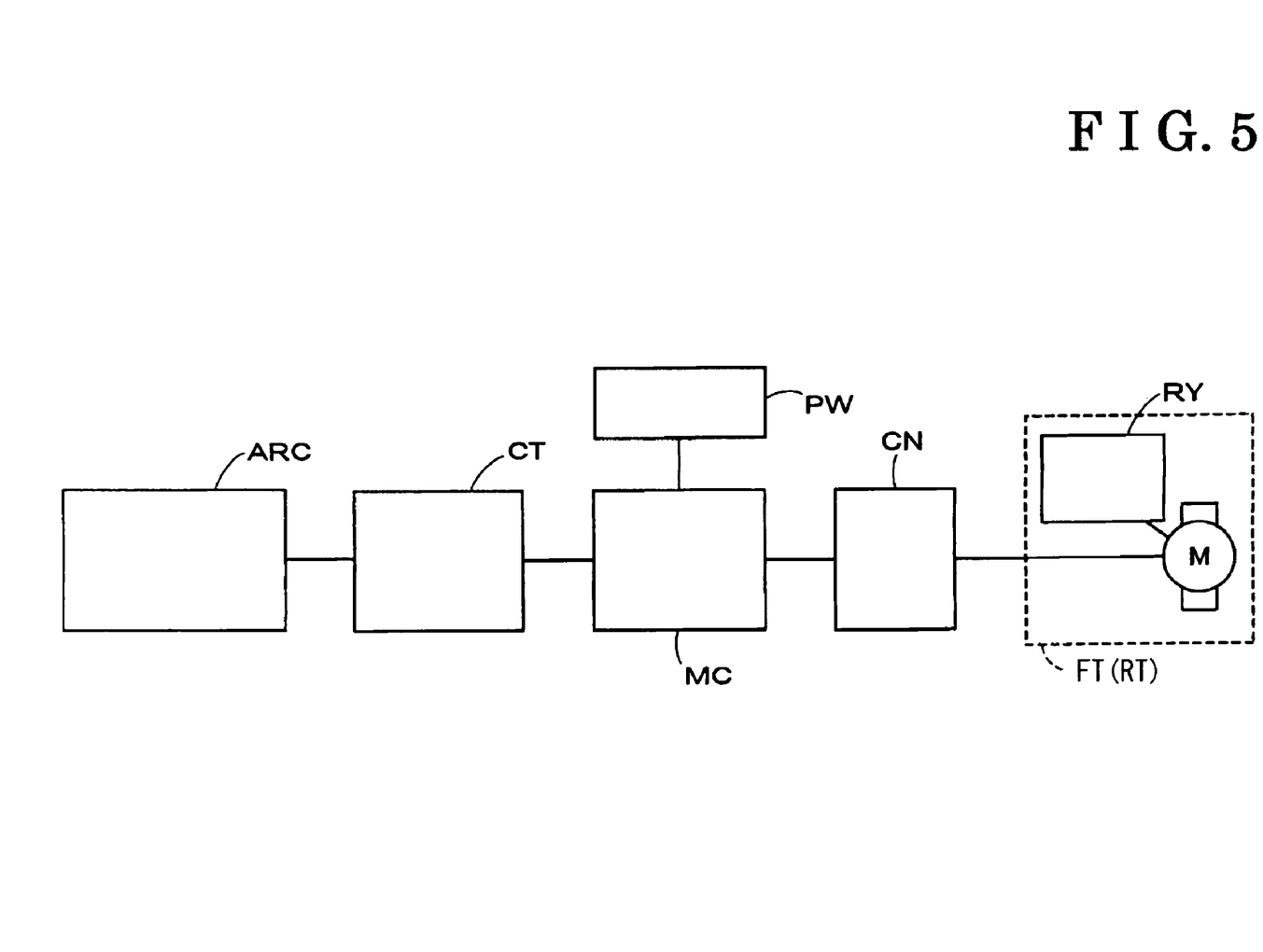
FIG. 5 is a block diagram showing the case that the stabilizer actuator is connected to a motor drive circuit via a connector according to the first embodiment of the present invention.

Further, in case a connector is used for electric wiring, the possibility that the connector is pulled away is considered. In case the stabilizer actuator FT (or the stabilizer actuator RT) is connected to the motor drive circuit MC via a connector CN, as shown in FIG. 5, it is preferable to position the motor relay RY at the electric motor M side relative to the connector CN in order to securely attain the short circuit state even when the connector of the motor relay RY is pulled away.

Figure 6:
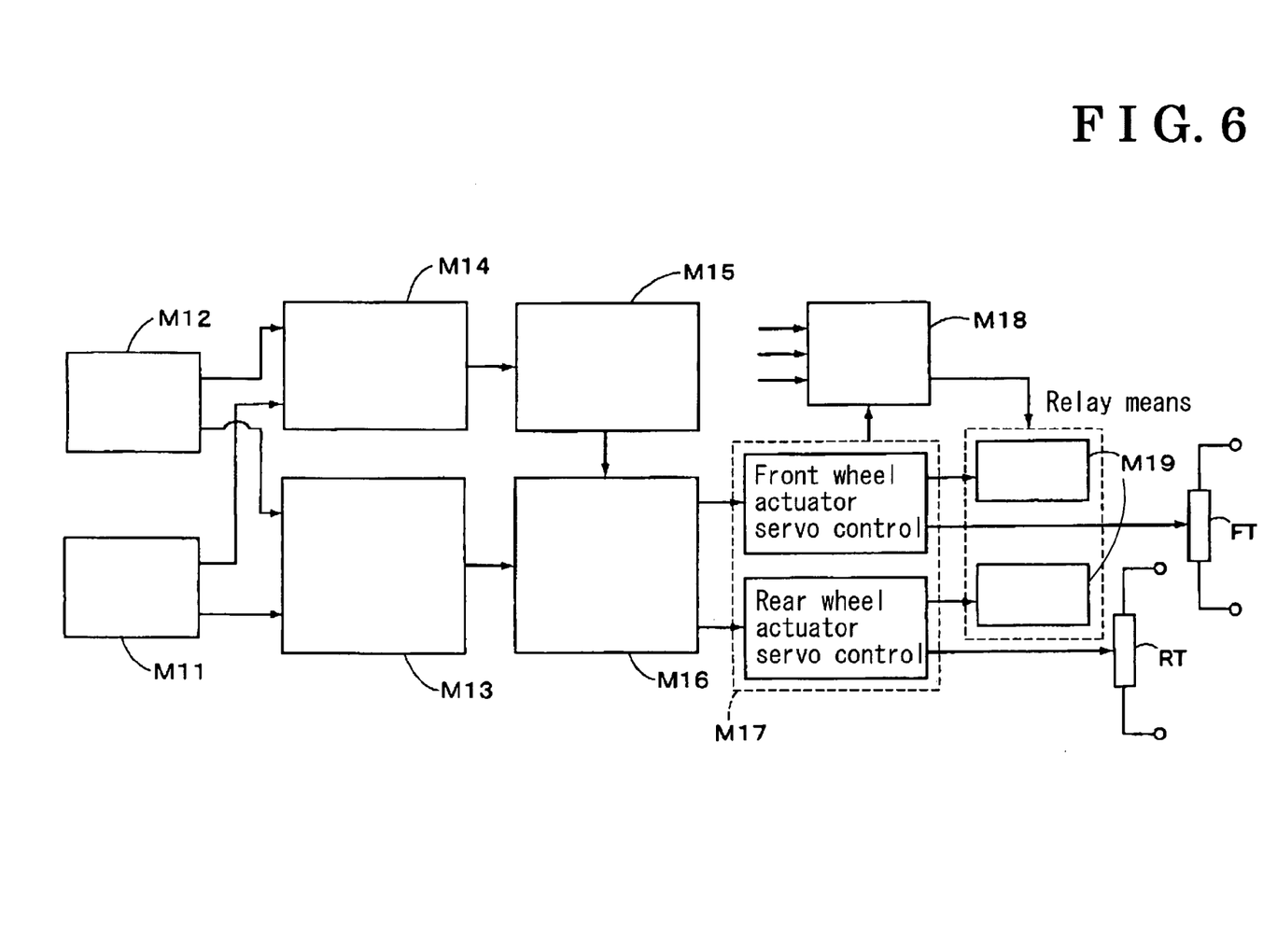
FIG. 6 is a diagram showing a system for an active roll restraint control according to the first embodiment of the present invention.

The system of an active roll control shown in FIG. 5 will be explained referring to FIG. 6. The information including the steering angle δf is detected by an operator's operation detection means M11, and the vehicle emotion state amount including the vehicle speed, the lateral acceleration, and the yaw rate is detected by a vehicle driving state detection means M12 at the steering operation by the operator. Based on the foregoing information, a vehicle active rolling moment target value for attaining the preferable rolling characteristics of the vehicle is calculated at a vehicle active rolling moment target value calculation portion at a vehicle active rolling moment target value calculation portion M13. The steering characteristic of the vehicle (i.e., under-steer and over-steer) is judged based on the steering operation by the operator and the vehicle motion state amount at a vehicle behavior judging calculation portion M14. Thereafter, a target value of the roll stiffness ratio of the front wheels and the rear wheels is calculated in accordance with the calculated steering characteristics and the vehicle motions state at a front and rear wheels roll stiffness ratio target value calculation portion M15. A target value of the active rolling moment of the front wheels and the rear wheels is calculated based on the target value of the roll stiffness ratio and the active rolling moment at a front wheel and rear wheel active rolling moment target value calculation portion M16. The stabilizer actuator FT, RT at the front wheels and at the rear wheels is controlled based on the target values at an actuator servo control portion M17. The motor relay RY (shown in FIG. 5) is positioned between the terminals of the electric motor M for driving the actuator. The motor relay RY is controlled by a relay driving means M19. The relay driving means M19 is controlled from the open position to be the closed position for short circuiting between the relay terminals at the generation of the failure based on the judgment result of the failure judging means M18. Thus, the braking torque is applied to the electric motor M at the failure to restrain the sudden change of the vehicle body roll angle.

Figure 7:
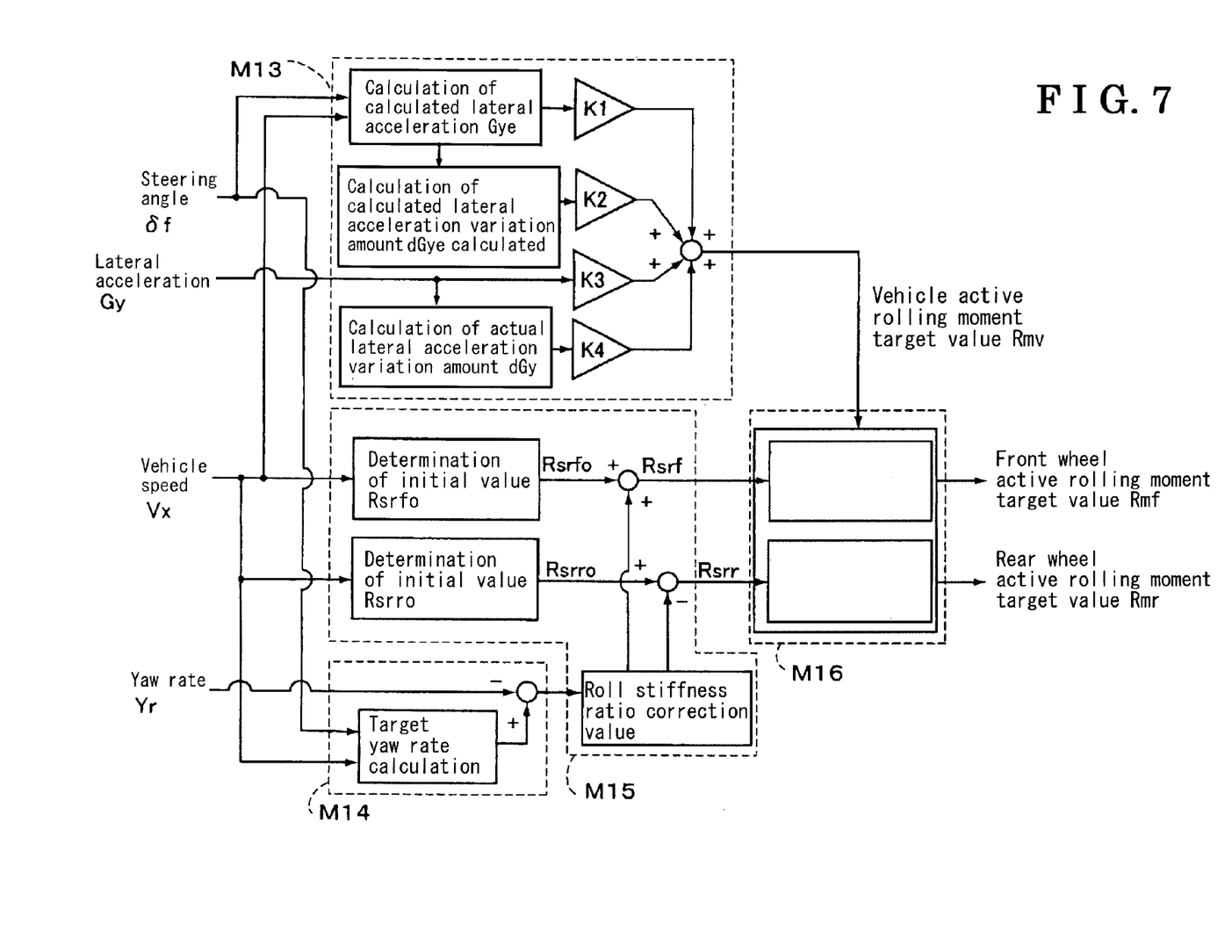
FIG. 7 is a diagram showing a system of the active roll restraint control of FIG. 6.

The active roll control ARC is further explained in details with reference to FIG. 7. An active rolling moment amount RMv used for restraining the rolling motion at the entire vehicle body is calculated based on the lateral acceleration Gy obtained from the signal from a lateral acceleration sensor YG, the lateral acceleration variation amount dGy attained by differentiating the lateral acceleration Gy with respect to time, the calculated lateral acceleration Gye calculated from the steering angle δf and the vehicle speed Vx, and the calculated lateral acceleration variation amount dGye attained by differentiating the calculated lateral acceleration Gye with respect to time at the vehicle active rolling moment target value calculation portion M13. The calculated lateral acceleration Gye is calculated as follows.

$$Gye=(Vx^2 \cdot \delta f)/\{L \cdot N \cdot (1+Kh \cdot Vx^2)\}$$

Herein, L stands for a wheelbase, N stand for a steering gear ratio, and Kh stands for a stability factor.

The active rolling moment Rmv to be applied to the entire vehicle for attaining the favorable rolling characteristics is obtained by a formula as follows.

$$Rmv=K1 \cdot Gy+K2 \cdot dGy++K3 \cdot Gye+K4 \cdot dGye$$

Herein, K1, K2, K3, K4 correspond to the control gain. In order to compensate for the response of the actuator and the delay of the control calculation, the calculated lateral acceleration Gye and the calculated lateral acceleration variation amount dGye obtained from the steering angle δf and the vehicle speed Vx are considered.

Figure 14:
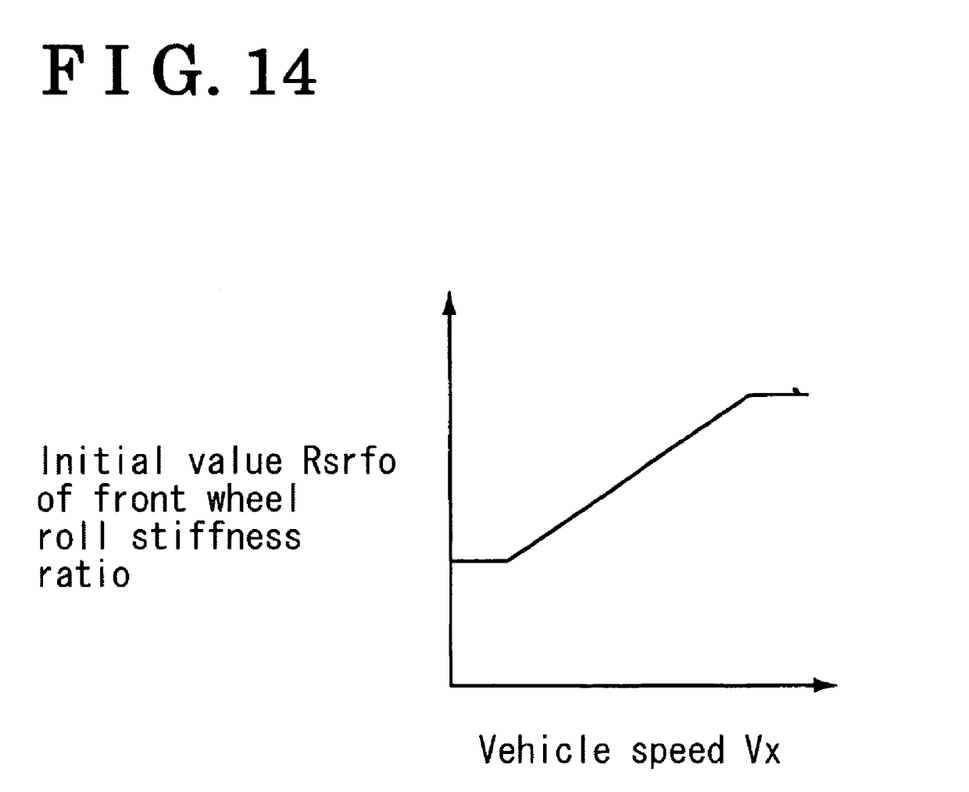
FIG. 14 is a graph showing characteristics when determining an initial value of a roll stiffness ratio for the front wheel.

A target value of the roll stiffness ratio at front wheels and rear wheels is determined at the roll stiffness ratio target value calculation portion M15 for the front and rear wheels. Initial values Rsrfo, Rsrro of the roll stiffness ratio at the front wheel side and the rear wheel side are determined based on the vehicle speed Vx. The initial value Rsrfo of the roll stiffness ratio at the front wheel is determined to be high at the low vehicle speed and to be high at the high vehicle speed as shown in FIG. 14. The initial value Rsrfo of the roll stiffness ratio at the front wheel is also determined to have a stronger under-steer tendency. The initial value Rsrro of the roll stiffness distribution ratio of the rear wheels is determined by subtracting the initial value Rsrfo of the roll stiffness ratio at the front wheel from one (i.e., 1-Rsrfo). Thereafter, a roll stiffness ratio correction value Rsra is calculated based on a yaw rate deviation ΔYr calculated at the vehicle behavior judgment calculation portion M14. The yaw rate deviation ΔYr is obtained by comparing an actual yaw rate Yr and a target yaw rate Yre calculated from the steering angle δf and the vehicle speed Vx for distinguishing the vehicle steering characteristics.

Accordingly, in case the vehicle is at the under-steer tendency, the roll stiffness ratios are corrected so that the roll stiffness ratio at the front wheel side is declined and the roll stiffness ratio at the rear wheel side is increased. To the contrary, in case the vehicle is at the over-steer tendency, the roll stiffness is corrected so that the roll stiffness ratio at the front wheel side is increased and the roll stiffness ratio at the rear wheel side is declined. Thereafter, the active rolling moment target values Rmf and Rmr at the front wheel and the at the rear wheel are respectively determined based on the roll stiffness target value Rsrf at the front wheel and the roll stiffness ratio target value Rsrr at the rear wheel, and the vehicle active rolling moment target value Rmv at the active rolling moment target value calculation portion M16 for the front wheel and the rear wheel. The front wheel and the rear wheel active rolling moment target values, Rmf, Rmr are determined as shown in the following formulas.

$$Rmf=Rmv \cdot Rsrf$$

$$Rmr=Rmv \cdot Rsrr$$

The torsional forces to be generated at the stabilizer actuator FT for the front wheel and at the stabilizer actuator for the rear wheel RT are determined based on the active rolling moment target value Rmf for the front wheel and the on the active rolling moment target vale Rmr, thus to control the electric motor M.

Figure 8:
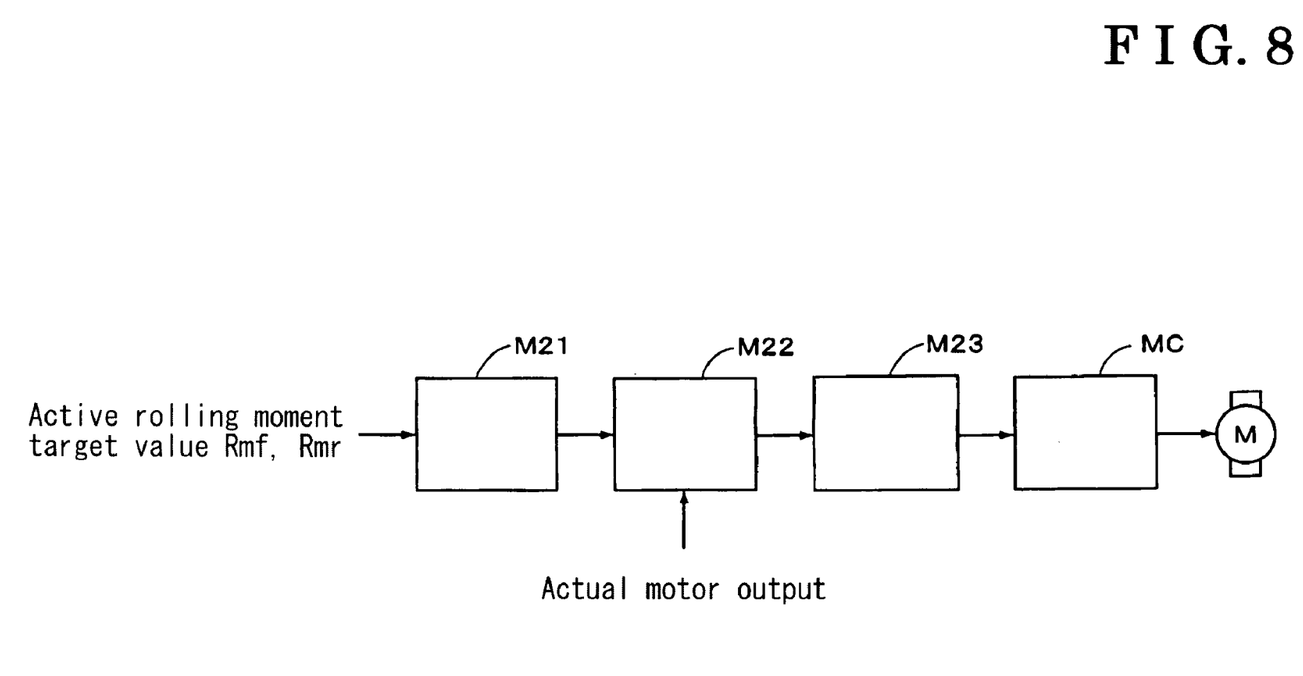
FIG. 8 is a diagram showing a system of a motor control according to the first embodiment of the present invention.

The electric motor M is controlled, for example, as shown in FIG. 8. A target value of the motor output is calculated from the active rolling moment target value Rmf, Rmr at a motor output target value calculation portion M21. The obtained target value of the motor output is compared with the actual motor output to attain a motor output deviation at a motor output deviation calculation portion M22. A PWM output outputted to the electric motor M is determined based on the motor output deviation at a PWM output calculation portion M23 for controlling a switching element at the motor drive circuit MC.

The failure judgment will be explained as follows. The failure is judged based on a sensor abnormality flag obtained from the communication bus. The signals of the steering angle δf, the vehicle speed Vx or the wheel speed Vwx for calculating the vehicle speed Vx, the lateral acceleration Gy, and the yaw rate Yr, or the like, used for the active roll control are inputted via the communication bus as shown in FIG. 1. Each sensor includes a self-check function for judging the failure. When the failure is judged at each sensor, a sensor abnormality flag is provided on the communication bus. In this case, the failure is judged by the failure judging means M18 of FIG. 6 and the information for the failure judgment is transmitted to the relay driving means M19.

If the abnormality is generated is observed between sensors. The sensor abnormality is judged when the inconsistency is generated between the vehicle state amounts at a predetermined relationship, and the abnormality flag is provided on the communication bus. For example, the failure is judged when the deviation between the lateral acceleration Gy and the yaw rate Yr multiplied by the vehicle speed Vx (i.e., the deviation between Gy and Yr·Vx) assumes equal to or greater than a predetermined value, wherein the relationship between the vehicle speed Vx, the lateral acceleration Gy, and the yaw rate Yr approximately assumes that the lateral acceleration Gy equals to the yaw rate Yr multiplied by the vehicle speed Vx (i.e., approximately Gy=Yr·Vx) at the normal traveling state.

Figure 9:
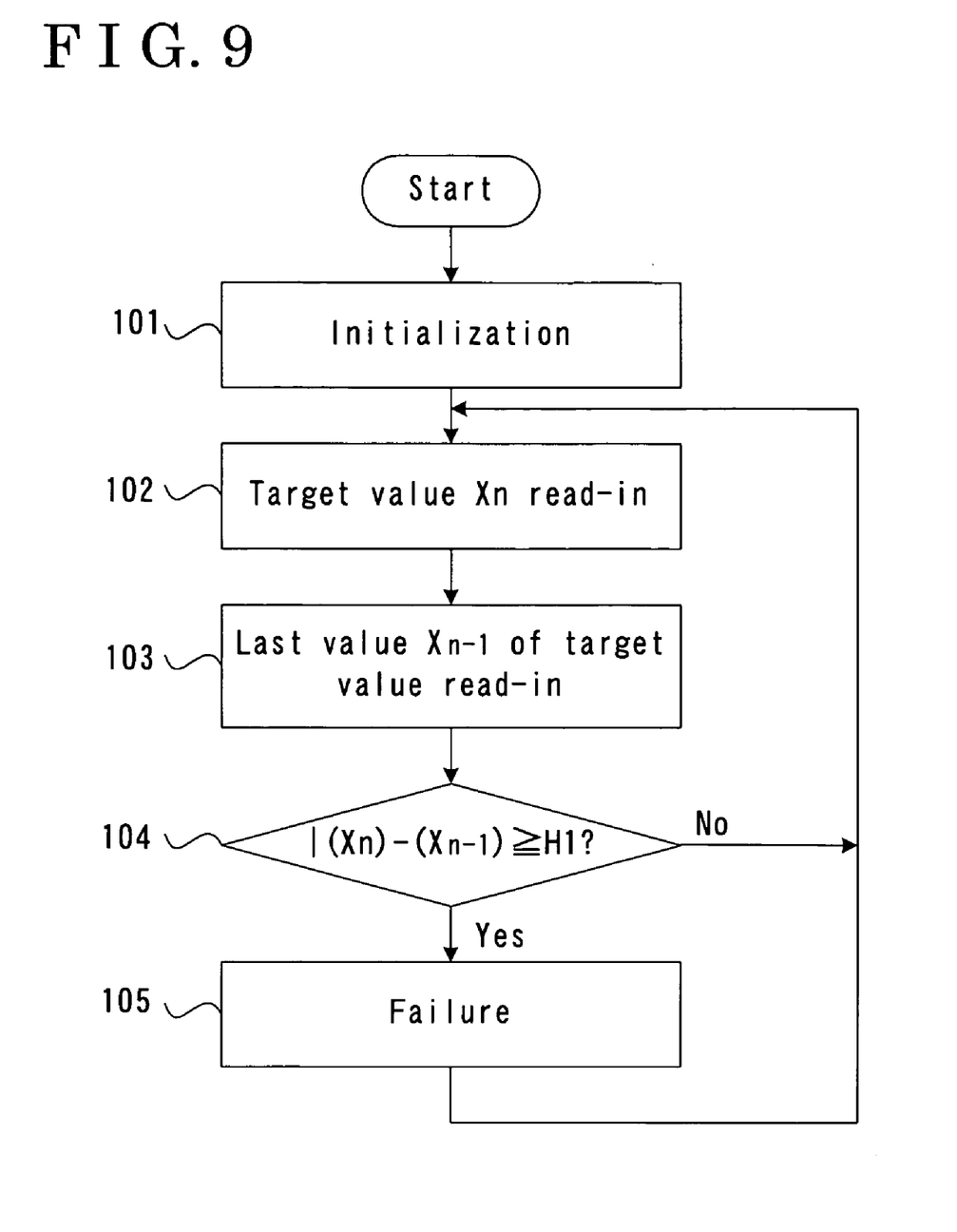
FIG. 9 is a flowchart showing a first failure judgment calculation according to the first embodiment of the present invention.
Figure 10:
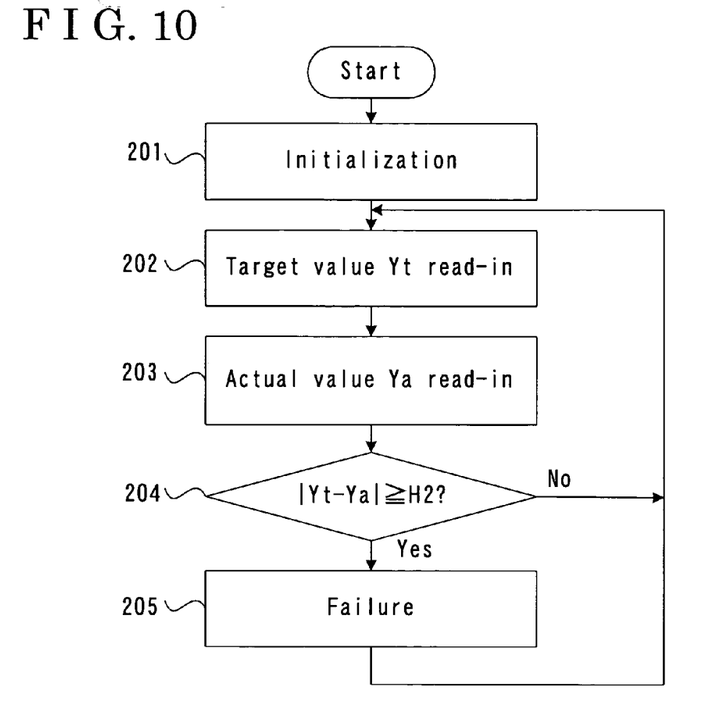
FIG. 10 is a flowchart showing a second failure judgment calculation according to the first embodiment of the present invention.
Figure 11:
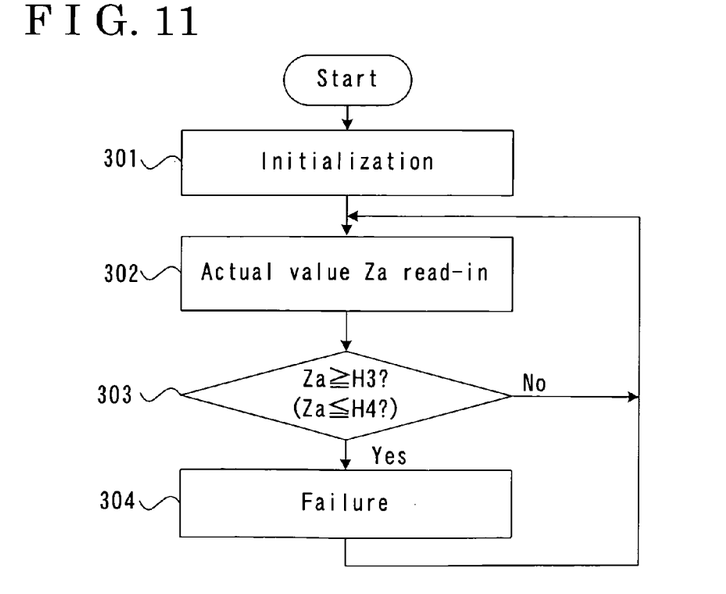
FIG. 11 is a flowchart showing a third failure judgment calculation according to the first embodiment of the present invention.

The failure may be judged based on each target value of the active roll control and the actually measured value (i.e., the actual value) from each sensor, which serves as a failure judgment calculation shown in FIG. 4, or the like. The steps for the failure judgment calculation are shown in FIGS. 9-11. As shown in FIG. 9, showing a first example of the steps for the failure judgment calculation, the failure judgment calculation is initialized at Step 101. A current value Xn of the target value is read in at Step 102. A last value Xn−1 of the target value is read in at Step 103. At Step 104, the current value Xn and the last value Xn−1 are compared. At the normal state, the current value Xn of the target value and the last value Xn−1 of the target value are not widely different. The increase of the absolute value of the deviation between the current value Xn of the target value and the last value Xn−1 of the target value shows the abnormality of the state amount for generating the deviation. When the absolute value of the deviation between the current value Xn of the target value and the last value Xn−1 of the target value assumes equal to or greater than a predetermined value H1, the failure is judged at Step 105. The target value shown in FIGS. 9-11 corresponds to the target value, which is vehicle active rolling moment, shown in FIGS. 7-8.

As to a second example for the steps for the failure judgment calculation, as shown in FIG. 10, the failure judgment calculation is initialized at Step 201. The target value Yt and the actual value Ya are read in at Step 202 and 203. The target value Yt and the actual value Ya are compared at Step 204. The failure is judged at Step 204 when the absolute value of the deviation between the target value Yt and the actual value Ya assumes equal to or greater than a predetermined value H2. The active roll control shown in FIGS. 7-8 is basically conducted based on the deviation between the target value and the actual value. At the normal operation, the target value Yt and the actual value Ya are not widely different. The absolute value of the deviation between the target value Yt and the actual value Ya is increased due to the abnormality of the state amount for generating the target value Yt, the sensor for detecting the actual value Ya, and the calculation result, or the like. The failure is judged when the absolute value of the deviation between the target value Yt and the actual value Ya assumes equal to or greater than the predetermined value H2 at Step 205. The target value Yt and the actual value Ya correspond to the target value (the calculation value), the sensor value shown in FIGS. 7-8.

With a third example for the steps for the failure judgment calculation, as shown in FIG. 11, the failure judgment calculation is initialized at Step 301. An actual value Za detected by the sensor is read in at Step 302. The actual value Za is compared with a predetermined value H3 at Step 303. The failure is judged when the actual value Za is equal to or greater than the predetermined value H3. For example, the failure judgment is conducted when the overcurrent equal to or greater than the predetermined value is detected by the detecting of the motor drive electric current of the motor drive circuit MC of FIG. 3. The actual value may have the top limitation value or may have the favorable value, or the like. For example, the failure is judged at Step 304 when the rotational angle from a rotational angle detection means RS (shown in FIG. 3) assumes equal to or greater than a predetermined value, or equal to or less than a predetermined value H4 although the vehicle is at a predetermined turning state.

Figure 15:
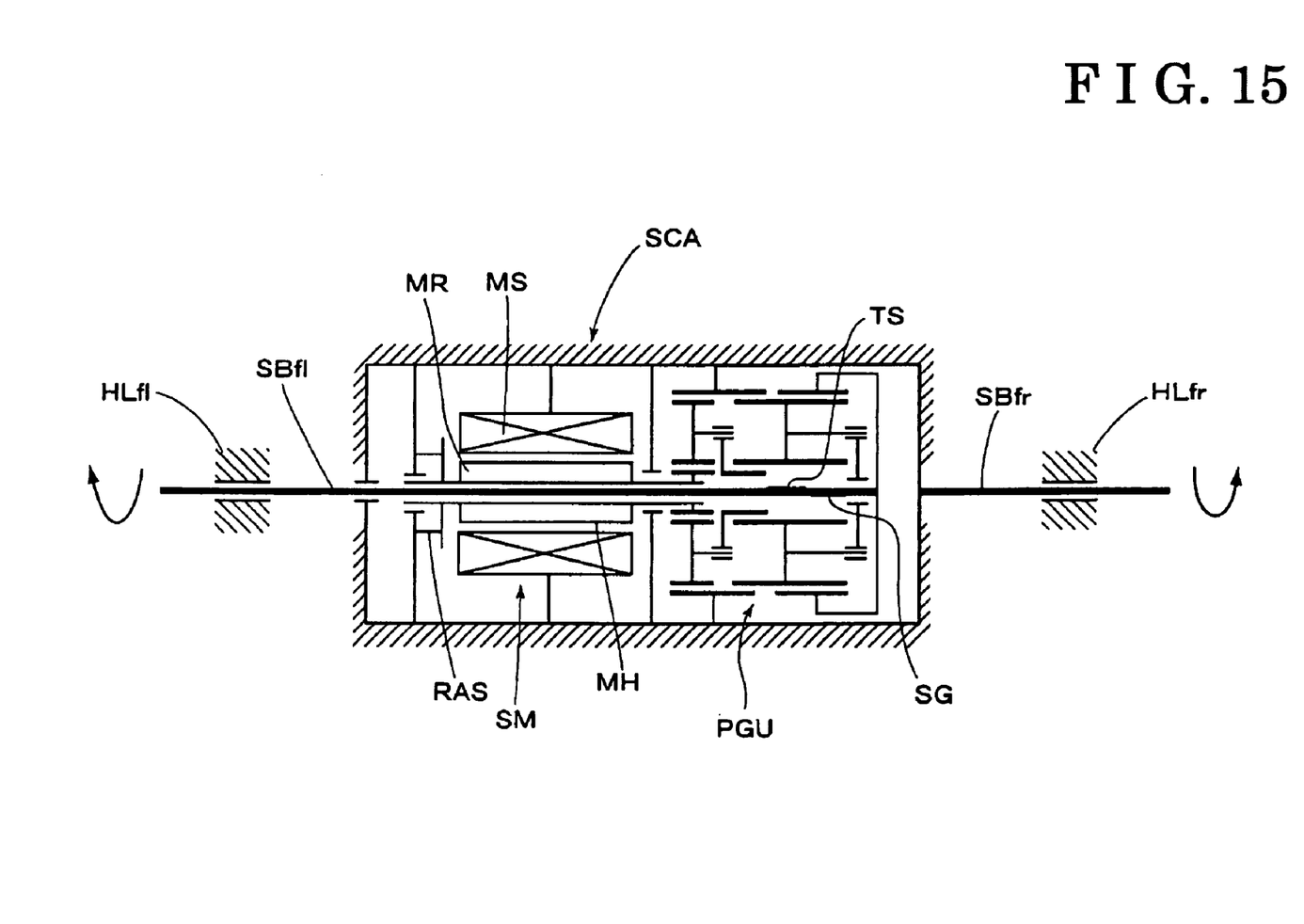
FIG. 15 is diagram showing a construction of a stabilizer actuator according to a second embodiment of the present invention.

A second embodiment of the present invention will be explained with reference to FIG. 15. Halved stabilizer bar SBfr, SBfl are positioned at ends of a stabilizer actuator SCA. The stabilizer bar SBfr, SBfl is supported by holding means HLfr, HLfl respectively. The stabilizer actuator SCA is connected to a suspension arm. An electric motor SM for providing the torsional rigidity is positioned on a shaft of one of the halved stabilizer bar, for example, the stabilizer bar SBfl. The electric motor SM includes a multi-polar brush-less motor and a hollow motor stator MS and a motor rotor MR positioned on the shaft of the stabilizer bar SBfl. The motor rotor MR includes a cylindrical member MH whose ends are supported by bearings. Multi-polar magnet is provided at the cylindrical member MH. The electric motor SM includes a rotational sensor RAS for detecting the shaft rotation of the stabilizer bar SBfl and SBfr approximate to the motor rotor MR. The rotational sensor RAS includes a magnet positioned in a ring configuration and include the same phase with the magnet of the motor rotor MR.

The stabilizer actuator SCA includes a deceleration gear PGU including a Ferguson Mechanical Paradox including a sun gear, a plurality of planetary gears, and a plurality of ring gears for transmitting the driving force by the rotation of the electric motor SM after decelerating. The rotation of the electric motor SM is decelerated by the deceleration gear PGU to transmit the torsional force to the stabilizer bars SBfr, SBfl. The combination of the gears used for the deceleration gear PGU is determined considering the specification of the electric motor and the deceleration ratio of the gear. Accordingly, with the second embodiment of the present invention, the vehicle roll generated at the vehicle traveling can be restrained or reduced by controlling to actively provide the torsional rigidity relative to the stabilizer bar SBfr, SBfl by the stabilizer actuator SCA.

According to the embodiment of the present invention, the favorable roll characteristics can be maintained by short circuiting the motor relay when the electric power is not supplied to the electric motor and the failure of the stabilizer control device is judged without increasing the size of the actuator.

According to the embodiment of the present invention, the short circuit between the motor terminals is securely conducted.

According to the embodiment of the present invention, the desired vehicle body roll angle variation can be provided by controlling the short circuit time of the motor relay.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A stabilizer control device comprising:
   a pair of stabilizer bars positioned between right and left wheels of a vehicle;
   an actuator positioned between said pair of stabilizer bars, the actuator comprising an electric motor which generates a torsional force on one of the pair of stabilizer bars relative to the other one of the pair of stabilizer bars; and
   a control means for controlling the electric motor in accordance with a turning state of the vehicle;
   a coil provided in the electric motor;
   at least one motor relay positioned in parallel with the coil of the electric motor, the motor relay including a relay for forming a short circuit at a non-energization state;
   wherein the motor relay is short circuited when electric power supply to the electric motor is stopped during the turning state of the vehicle.

2. The stabilizer control device according to claim 1, wherein the control means control a short circuit time of the motor relay in accordance with a predetermined vehicle body roll angle variation relative to the vehicle.

3. The stabilizer control device according to claim 1, further comprising:
   a motor drive circuit for driving the electric motor; and
   a connector for connecting the electric motor and the motor drive circuit; wherein
   the motor relay is short circuited when the connector is disconnected.

4. The stabilizer control device according to claim 1, further comprising:
   a motor drive circuit for driving the electric motor; and
   a connector for connecting the electric motor and the motor drive circuit wherein the motor relay is positioned at the electric motor side relative to the connector so that the motor relay is short circuited when the connector is disconnected.

5. A stabilizer control device comprising:
   a pair of stabilizer bars positioned between right and left wheels of a vehicle;

an actuator positioned between said pair of stabilizer, the actuator comprising an electric motor which generates a torsional force on one of the pair of stabilizer bars relative to the other one of the pair of stabilizer bars;

a control means for controlling the electric motor in accordance with a turning state of the vehicle;

at least one motor relay positioned in parallel with at least one coil of the electric motor, the motor relay including a relay for forming a short circuit at a non-energization state; and a failure judging means for judging failure of the stabilizer control device during the turning state of the vehicle;

wherein the motor relay is short circuited when the failure judging means judges the failure of the stabilizer control device.

6. The stabilizer control device according to claim 5, wherein the control means control a short circuit time of the motor relay in accordance with a predetermined vehicle body roll angle variation relative to the vehicle.

7. The stabilizer control device according to claim 5, further comprising:

a motor drive circuit for driving the electric motor; and a connector for connecting the electric motor and the motor drive circuit; wherein the motor relay is short circuited when the failure judging means judges that the connector is disconnected.

8. The stabilizer control device according to claim 5, further comprising:

a motor drive circuit for driving the electric motor; and a connector for connecting the electric motor and the motor drive circuit wherein the motor relay is positioned at the electric motor side relative to the connector so that the motor relay is short circuited when the connector is disconnected.

9. A stabilizer control device comprising:

a first stabilizer bar and a second stabilizer bar positioned between a right wheel of a vehicle and a left wheel of the vehicle;

a motor operatively connected to the first stabilizer bar and the second stabilizer bar to generate a torsional force on one of the stabilizer bars relative to the other one of the stabilizer bars;

the motor comprising a coil;

control means for controlling the electric motor during a turning state of the vehicle; and at least one motor relay positioned in parallel with the coil and short circuited when electric power supply to the electric motor is stopped during the turning state of the vehicle, and wherein the motor relay is of a type which short circuits at a non-enerpization state.

10. The stabilizer control device according to claim 9, wherein the control means controls a short circuit time of the motor relay in accordance with a vehicle body roll angle variation relative to the vehicle.

11. The stabilizer control device according to claim 9, further comprising:

a motor drive circuit for driving the electric motor; and a connector for connecting the electric motor and the motor drive circuit;

wherein the motor relay is short circuited when the connector is disconnected.

12. The stabilizer control device according to claim 9, further comprising:

a motor drive circuit for driving the electric motor; and a connector for connecting the electric motor and the motor drive circuit wherein the motor relay is positioned at the electric motor side relative to the connector so that the motor relay is short circuited when the connector is disconnected.

* * * * *